US008642704B2

(12) United States Patent
Rademacher et al.

(10) Patent No.: US 8,642,704 B2
(45) Date of Patent: Feb. 4, 2014

(54) HYSTERESIS ELASTOMERIC COMPOSITIONS COMPRISING POLYMERS TERMINATED WITH ISOCYANATO ALKOXYSILANES

(75) Inventors: Christine Rademacher, Akron, OH (US); David F. Lawson, Uniontown, OH (US); Terrence E. Hogan, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 161 days.

(21) Appl. No.: 12/785,848

(22) Filed: May 24, 2010

(65) Prior Publication Data

US 2010/0234534 A1 Sep. 16, 2010

Related U.S. Application Data

(63) Continuation of application No. 10/560,099, filed as application No. PCT/US2004/018285 on Jun. 9, 2004, now abandoned.

(60) Provisional application No. 60/477,012, filed on Jun. 9, 2003.

(51) Int. Cl.
*C08F 36/02* (2006.01)
*C08F 8/30* (2006.01)
*C08F 8/34* (2006.01)

(52) U.S. Cl.
USPC ............. 525/332.9; 525/123; 525/331.9; 525/333.1; 525/333.3; 525/333.2; 525/333.6; 525/342; 525/374; 526/82; 526/83; 526/85; 526/335; 526/340; 526/346; 526/347; 526/347.1; 152/525; 156/110.1; 156/114

(58) Field of Classification Search
USPC ............. 525/123, 331.9, 333.1, 333.3, 333.2, 525/333.6, 342, 374, 332.9; 526/82, 83, 85, 526/335, 340, 346, 347, 347.1; 152/525; 156/110.1, 114
See application file for complete search history.

(56) References Cited

U.S. PATENT DOCUMENTS

| 2,787,647 | A | | 4/1957 | Crouch et al. |
| 4,146,585 | A | * | 3/1979 | Ward et al. ............ 525/102 |
| 4,409,368 | A | | 10/1983 | Vitus et al. |
| 4,429,091 | A | | 1/1984 | Hall |
| 4,824,908 | A | * | 4/1989 | Tsutsumi et al. ............ 525/99 |
| 5,017,636 | A | | 5/1991 | Hattori et al. |
| 5,112,929 | A | | 5/1992 | Hall |
| 5,464,899 | A | | 11/1995 | Freeman et al. |
| 5,627,119 | A | * | 5/1997 | Biagini et al. ............ 502/152 |
| 5,659,056 | A | | 8/1997 | Hergenrother et al. |
| 5,786,448 | A | | 7/1998 | Nefzi et al. |
| 5,866,171 | A | | 2/1999 | Kata |
| 5,876,527 | A | | 3/1999 | Tsuruta et al. |
| 5,931,211 | A | | 8/1999 | Tamura |
| 5,971,046 | A | | 10/1999 | Koch et al. |
| 5,990,251 | A | | 11/1999 | Gelus |
| 6,008,295 | A | * | 12/1999 | Takeichi et al. ............ 525/105 |
| 6,025,450 | A | | 2/2000 | Lawson et al. |
| 6,046,288 | A | | 4/2000 | Lawson et al. |
| 6,080,853 | A | | 6/2000 | Corrigan et al. |
| 6,228,908 | B1 | | 5/2001 | Takeichi et al. |
| 6,451,935 | B1 | | 9/2002 | Schreffler et al. |

FOREIGN PATENT DOCUMENTS

| EP | 0 379 951 A2 | | 8/1990 |
| EP | 0 767 179 A2 | | 4/1997 |
| EP | 0 801 078 A1 | | 10/1997 |
| EP | 0 894 825 A1 | | 2/1999 |
| EP | 1505087 | | 2/2005 |
| GB | 1069087 | | 5/1967 |
| WO | WO 01/34658 | * | 5/2001 |
| WO | WO 01/34658 A1 | | 5/2001 |

OTHER PUBLICATIONS

International Report on Patentability for parent application PCT/US2004/018285, dated Aug. 10, 2005, 6 pages.
International Search Report for parent application PCT/US2004/018285, dated Dec. 23, 2004, 2 pages.

* cited by examiner

*Primary Examiner* — Robert C Boyle
(74) *Attorney, Agent, or Firm* — Meredith E. Hooker; Arthur M. Reginelli

(57) ABSTRACT

A functionalized polymer terminated by using an isocyanato alkoxysilane terminating agent. A method of preparing a functionalized polymer comprising the step of contacting a living polymer with an isocyanato alkoxysilane terminating agent.

16 Claims, No Drawings

HYSTERESIS ELASTOMERIC COMPOSITIONS COMPRISING POLYMERS TERMINATED WITH ISOCYANATO ALKOXYSILANES

This application is a continuation of Non-Provisional patent application Ser. No. 10/560,099, filed on Dec. 9, 2005 now abandoned, and gains benefit from International Application Serial No. PCT/US04/18285, filed Jun. 9, 2004 and U.S. Provisional Patent Application No. 60/477,012, filed Jun. 9, 2003, all of which are incorporated herein by reference.

FIELD OF THE INVENTION

This invention relates to functionalized polymers terminated with isocyanato alkoxysilane and methods for making the same. The functionalized polymers are particularly useful in fabricating tires.

BACKGROUND OF THE INVENTION

In the art of making tires, it is desirable to employ rubber vulcanizates that demonstrate reduced hysteresis loss, i.e., less loss of mechanical energy to heat. Hysteresis loss is often attributed to polymer free ends within the cross-linked rubber network, as well as the disassociation of filler agglomerates.

Functionalized polymers have been employed to reduce hysteresis loss. The functional group of the functionalized polymer is believed to interact with a filler particle and thereby reduce the number of polymer free ends. Also, the interaction between the functional group and the filler particles reduces filler agglomeration, which thereby reduces hysteretic losses attributable to the disassociation of filler agglomerates (i.e., Payne effect).

Conjugated diene monomers are often anionically polymerized by using alkyllithium compounds as initiators. Selection of certain alkyllithium compounds can provide a polymer product having a functionality at the head of the polymer chain. A functional group can also be attached to the tail end of an anionically-polymerized polymer by terminating a living polymer with a functionalized compound.

For example, trialkyltin chlorides, such as tributyl tin chloride, have been employed to terminate the polymerization of conjugated dienes, as well as the copolymerization of conjugated dienes and vinyl aromatic monomers, to produce polymers having a trialkyltin functionality at the tail end of the polymer. These polymers have proven to be technologically useful in the manufacture of tire treads that are characterized by improved traction, low rolling resistance, and improved wear.

Because functionalized polymers are advantageous, especially in the preparation of tire compositions, there exists a need for additional functionalized polymers. Moreover, because precipitated silica has been increasingly used as a reinforcing particulate filler in tires, functionalized elastomers having affinity to silica filler are needed.

SUMMARY OF THE INVENTION

In general the present invention provides a method for preparing a functionalized polymer, the method comprising contacting an anionically-polymerized living polymer with an isocyanato alkoxysilane or isothiocyanato alkoxysilane.

The present invention also includes a vulcanizate prepared by vulcanizing a rubber formulation comprising at least one vulcanizable rubber and a filler, where the at least one vulcanizable rubber is a functionalized polymer that is formed by contacting an anionically-polymerized living polymer with an isocyanato alkoxysilane or isothiocyanato alkoxysilane.

The present invention further includes a functionalized polymer that is defined by the formula

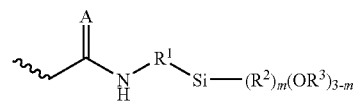

where ∼∼∼ is an anionically-polymerized polymer, A is oxygen or sulfur, $R^1$ is a divalent organic group, each $R^2$ and $R^3$ is a monovalent organic group, and m is an integer from 0 to 2.

DETAILED DESCRIPTION OF ILLUSTRATIVE EMBODIMENTS

The functionalized polymers of this invention are preferably prepared by contacting anionically-polymerized living polymers with isocyanato alkoxysilane compounds. Useful isocyanato alkoxysilane compounds include those represented by the formula:

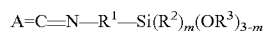

where A is oxygen or sulfur, $R^1$ is a divalent organic group, each $R^2$ and $R^3$ is independently a monovalent organic group, and m is an integer from 0 to 2. Each $R^2$ and $R^3$ is preferably an alkyl group having 1 to 4 carbon atoms. Where A is sulfur, the above formula represents an isothiocyanato alkoxysilane compound. For purposes of this specification, the term "isocyanato alkoxysilane" will also refer to isothiocyanato alkoxysilane compounds. Isocyanato alkoxysilane compounds are described, for example, in U.S. Pat. No. 4,146,585, which is incorporated herein by reference.

The divalent organic group is preferably a hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form the group, up to about 20 carbon atoms. These hydrocarbylene groups may contain heteroatoms such as, but not limited to, nitrogen, oxygen, silicon, sulfur, and phosphorus atoms.

The monovalent organic groups are preferably hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms. The preferred monovalent organic groups will not react with a living polymer.

Particularly preferred isocyanato alkoxysilane compounds include gamma-isocyanatopropyl-triethoxysilane, gamma-isothiocyanatopropyl-triethoxysilane, gamma-isocyanatopropyl-trimethoxysilane, and gamma-isothiocyanatopropyl-trimethoxysilane. Commercially available isocyanato alkoxysilane compounds include, for example, gamma-isocyanatopropyl-trimethoxysilane, which is available under the tradename Silquest A-Link 35 (General Electric OSi Corp.).

Anionically-polymerized living polymers can be formed by reacting anionic initiators with certain unsaturated monomers to propagate a polymeric structure. Throughout formation and propagation of the polymer, the polymeric structure is anionic and "living." A living polymer, therefore, is a polymeric segment having a living or reactive end. For example, when a lithium (Li) containing initiator is employed to initiate the formation of a polymer, the reaction produces a reactive polymer having a Li atom at its living end. A new batch of monomer subsequently added to the reaction can add to the living ends of the existing chains and increase the degree of polymerization. For further information respecting anionic polymerizations, one can refer to George Odian, *Principles of Polymerization*, ch. 5 ($3^{rd}$ Ed. 1991), or Panek, 94 J. Am. Chem. Soc., 8768 (1972).

Monomers that can be employed in preparing an anionically-polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, α-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

One preferred type of living polymer is a copolymer of styrene and 1,3-butadiene (SBR). Preferably, the styrene content of the SBR copolymer is from about 10 to about 50 percent by weight of the total polymer, and more preferably from about 18 to about 40 percent by weight of the total polymer. From about 8 to about 99 percent of the units derived from the 1,3-butadiene are preferably of the 1,2-vinyl microstructure, more preferably from about 10 to about 60 percent of the units derived from the 1,3-butadiene are of the 1,2-vinyl microstructure. Preferably, the remaining units derived from the 1,3-butadiene are in the 1,4-cis- or 1,4-trans-microstructure at a relative ratio of about 3 cis-units to 5 trans-units.

Any anionic initiator can be employed to initiate the formation and propagation of the living polymers. Preferably, the anionic initiator comprises at least one element from Group 1 or Group 2 of the Periodic Table, according to the new notation of the IUPAC, as reported in *Hawley's Condensed Chemical Dictionary*, ($13^{th}$ Ed. 1997). The elements in Groups 1 and 2 are commonly referred to as alkali metals and alkaline earth metals, respectively. More preferably, the anionic initiator comprises lithium.

Exemplary initiators include, but are not limited to, alkyl lithium initiators such as n-butyl lithium, arenyllithium initiators, arenylsodium initiators, N-lithium dihydrocarbon amides, aminoalkyllithiums, and alkyl tin lithiums. Other useful initiators include N-lithiohexamethyleneimide, N-lithiopyrrolidinide, and N-lithiododecamethyleneimide as well as organolithium compounds such as the alkyl lithium adducts of substituted aldimines and substituted ketimines, N-lithio salts of substituted secondary amines, and organosulfur compounds such as sulfur-containing heterocycles. Exemplary initiators are also described in the following U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. Preferably, the anionic polymerization is conducted in the absence of lanthanide compounds such as those used in coordination catalysis.

The amount of initiator employed in conducting anionic polymerizations can vary widely based upon the desired polymer characteristics. In one embodiment, it is preferred to employ from about 0.1 to about 100, and more preferably from about 0.33 to about 10 mmol of lithium per 100 g of monomer.

Anionic polymerizations are typically conducted in a polar solvent such as tetrahydrofuran (THF) or a nonpolar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers and amines.

Compounds useful as polar coordinators include those having an oxygen or nitrogen heteroatom and a non-bonded pair of electrons. Examples include dialkyl ethers of mono and oligo alkylene glycols; "crown" ethers, tertiary amines such as tetramethylethylene diamine (TMEDA), linear THF oligomers, and the like. Specific examples of compounds useful as polar coordinators include tetrahydrofuran (THF), linear and cyclic oligomeric oxolanyl alkanes such as 2,2-bis (2'-tetrahydrofuryl) propane, dipiperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, which is incorporated herein by reference.

Anionically-polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 200° C. and the polymerization is allowed to proceed for from about 0.1 to about 24 hours. This reaction produces a reactive polymer having a lithium atom at its reactive or living end. Preferably, at least about 30 percent of the polymer molecules contain a living end. More preferably, at least about 50 percent of the polymer molecules contain a living end.

A continuous polymerization is preferably begun by charging monomer(s), initiator and solvent at the same time to a suitable reaction vessel. Thereafter, a continuous regime is typically followed that removes product after a suitable residence time and replenishes the reactants.

The isocyanato alkoxysilane terminating compounds react with the living polymer end. The reaction can be achieved by simply mixing the isocyanato alkoxysilane compound with the living polymer. In a preferred embodiment, these terminating compounds are added once a peak polymerization temperature is observed, which is indicative of nearly complete monomer conversion. Because live ends may self terminate, it is especially preferred to add the terminating agent within about 25 to about 35 minutes of the peak polymerization temperature.

The living polymer is typically contacted with terminating agent in a solvent or diluent. The solvent is preferably one in which both the polymer and terminating agent are soluble. In one embodiment, the reaction can occur in the same medium in which the polymerization occurred.

The amount of terminating agent is not limited, and can vary widely depending upon the terminating agent and the amount of functionalization desired. In one embodiment, it is preferred to employ from about 0.3 to about 1 equivalent of terminating agent per equivalent of initiator, more preferably, from about 0.4 to about 0.9 equivalents of terminating agent, and even more preferably from about 0.5 to about 0.8 equivalents of terminating agent per equivalent of initiator. It will be appreciated that these numbers are based upon the amount of initiator added to the system, and may or may not reflect the amount of initiator that is associated with the polymer.

Preferably, at least about 40 percent of the polymer molecules are functionalized with the terminating agent. More preferably, at least about 50 percent of the polymer molecules are functionalized with the terminating agent of the present invention.

It is believed that this reaction results in a terminated polymer having both an amide and an alkoxysilane functionality, as set forth in the following reaction mechanism:

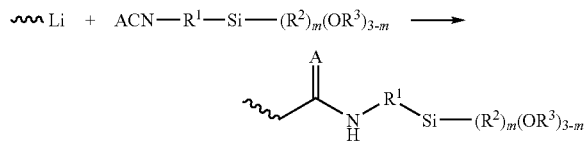

where ∼∼∼Li is an anionically-polymerized polymer and A, $R^1$, $R^2$, $R^3$, and m are as described above. Other structures, however, are also possible as the result of side reactions or coupling reactions.

When a functionalized initiator is employed, the result is believed to be a multi-functionalized polymer such as that described by the general formula:

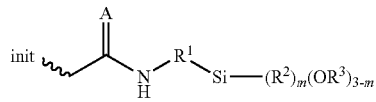

where init is a functional residue from a functional initiator and A, $R^1$, $R^2$, $R^3$, and m are as described above. Preferably, init is a functionality or functional group that reacts or interacts with rubber or rubber fillers or otherwise has a desirable impact on filled rubber compositions or vulcanizates. Those groups or substituents that react or interact with rubber or rubber fillers or otherwise have a desirable impact on filler rubber compositions or vulcanizates are known and may include trialkyl tin substituents, cyclic amine groups, or sulfur-containing heterocycles. Exemplary trialkyl tin substituents are disclosed in U.S. Pat. No. 5,268,439, which is incorporated herein by reference. Exemplary cyclic amine groups are disclosed in U.S. Pat. Nos. 6,080,853, 5,786,448, 6,025,450, and 6,046,288, which are incorporated herein by reference. Exemplary sulfur-containing heterocycles are disclosed in WO 200/020475, which is incorporated herein by reference.

After formation of the functionalized polymer, a processing aid and other optional additives such as oil can be added to the polymer cement. The functionalized polymer and other optional ingredients are then isolated from the solvent and preferably dried. Conventional procedures for desolventization and drying may be employed. In one embodiment, the functionalized polymer may be isolated from the solvent by steam desolventization or hot water coagulation followed by filtration. Residual solvent may be removed by using conventional drying techniques such as oven drying or drum drying. Alternatively, the cement may be directly drum dried.

The functionalized polymers of this invention are particularly useful in preparing tire components. These tire components can be prepared by using the functional polymers of this invention alone or together with other rubbery polymers. Other rubbery elastomers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery elastomers may derive from the polymerization of ethylene together with one or more α-olefins and optionally one or more diene monomers.

Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in 20 *Kirk-Othmer, Encyclopedia of Chemical Technology*, 365-468, ($3^{rd}$ Ed. 1982), particularly *Vulcanization Agents and Auxiliary Materials*, 390-402, and A. Y. Coran, *Vulcanization* in *Encyclopedia of Polymer Science and Engineering*, ($2^{nd}$ Ed. 1989), which are incorporated herein by reference. Vulcanizing agents may be used alone or in combination.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These stocks are useful for forming tire components such as treads, subtreads, black sidewalls, body ply skins, bead filler, and the like. Preferably, the functional polymers are employed in tread formulations, and these tread formulations will include from about 10 to about 100% by weight of the functional polymer based on the total rubber within the formulation. More preferably, the tread formulation will include from about 35 to about 90% by weight, and more preferably from about 50 to 80% by weight of the functional polymer based on the total weight of the rubber within the formulation. The preparation of vulcanizable compositions and the construction and curing of the tire is not affected by the practice of this invention.

Preferably, the vulcanizable rubber composition is prepared by forming an initial masterbatch that includes the rubber component and filler. This initial masterbatch is preferably mixed at a starting temperature of from about 25° C. to about 125° C. with a discharge temperature of about 135° C. to about 180° C. To prevent premature vulcanization (also known as scorch), this initial masterbatch generally excludes any vulcanizing agents. Once the initial masterbatch is processed, the vulcanizing agents may be introduced and blended into the initial masterbatch at low temperatures in a final mix stage, which does not initiate the vulcanization process. Optionally, additional mixing stages, sometimes called remills, can be employed between the masterbatch mix stage and the final mix stage. Rubber compounding techniques and the additives employed therein are generally known, as disclosed in the in Stephens, *The Compounding and Vulcanization of Rubber*, in *Rubber Technology* ($2^{nd}$ Ed. 1973). The mixing conditions and procedures applicable to silica-filled tire formulations are also well known as described in U.S. Pat. Nos. 5,227,425, 5,719,207, 5,717,022, as well as European Patent No. 890,606, all of which are incorporated herein by reference.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it is heated to about 140 to about 180° C. Cured or crosslinked rubber compositions may be referred to as vulcanizates, which generally contain three-dimensional polymeric networks that are thermoset. The other ingredients, such as processing aides and fillers, are generally evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

To a 18.9 L reactor equipped with turbine agitator blades was added 4.8 kg hexane, 1.22 kg (33 wt %) styrene in hexane, and 7.39 kg (22.1 wt %) 1,3-butadiene in hexane. To the reactor was charged 11 mL of 1.68 M butyllithium in hexane and 3.83 mL of 1.6 M 2,2'-di(tetrahydrofuryl)propane in hexane and the batch temperature was controlled at from 50° C. to about 58° C. After approximately 45 minutes, the batch was cooled to 32° C. and a measured amount of live poly(styrene-co-butadiene)cement was then transferred to a sealed nitrogen purged 800 mL bottle. The bottle contents were then terminated with isopropanol, coagulated and drum dried. The $T_g$ of the polymer was −32° C.

Example 2

A second measured amount of live poly(styrene-co-butadiene)cement prepared in Example 1 was transferred to a sealed nitrogen purged bottle, and to this was added 1 equivalent of isocyanatopropyl trimethoxysilane (Silquest® A-Link 35) per equivalent of butyllithium. The contents of the bottle were agitated at about 50° C. for about 30 minutes. The bottle contents were then coagulated and drum dried. The polymers of Examples 1 and 2 were characterized as set forth in Table I.

TABLE I

| | Example No. | |
|---|---|---|
| | 1 | 2 |
| $M_n$ (kg/mol) | 111 | 238 |
| $M_w/M_n$ | 1.06 | 1.78 |

The rubber of Examples 1 and 2 were employed in carbon black and carbon black/silica tire formulations. The formulations are presented in Table II. More specifically, the rubber of Example 1 was incorporated in the formulations of Examples 3 and 5. The rubber of Example 2 was incorporated in the formulations of Examples 4 and 6.

TABLE II

| | Example No. (weight parts) | | | |
|---|---|---|---|---|
| | 3 | 4 | 5 | 6 |
| Initial | | | | |
| Rubber Sample | 100 | 100 | 100 | 100 |
| Carbon Black | 55 | 55 | 35 | 35 |
| Silica | 0 | 0 | 30 | 30 |
| Wax | 1 | 1 | 0 | 0 |
| Antiozonant | 0.95 | 0.95 | 0.95 | 0.95 |
| Zinc Oxide | 2.5 | 2.5 | 0 | 0 |
| Stearic Acid | 1.5 | 1.5 | 1.5 | 1.5 |
| Aromatic Oil | 10 | 10 | 10 | 10 |
| Total | 177.45 | 177.45 | 177.45 | 177.45 |
| Intermediate | | | | |
| Initial | N/A | N/A | 177.45 | 177.45 |
| Silane Shielding Agent | N/A | N/A | 4.57 | 4.57 |
| Total | 177.45 | 177.45 | 182.02 | 182.02 |
| Final Formulation | | | | |
| Initial | 171.45 | 171.45 | 182.02 | 182.02 |
| Sulfur | 1.3 | 1.3 | 1.7 | 1.7 |
| Zinc Oxide | 0 | 0 | 2.5 | 2.5 |
| Pre-Vulcanization Inhibitor | 0 | 0 | 0.25 | 0.25 |
| Accelerators | 1.9 | 1.9 | 2.0 | 2.0 |
| Total | 174.65 | 174.65 | 188.47 | 188.47 |

Examples 3 and 4

Each carbon black rubber compound was prepared in two stages, which are named Initial (Masterbatch) and Final. In the initial stage, the polymer from Example 1 or 2 was mixed with carbon black, an antioxidant, stearic acid, wax, aromatic oil, and zinc oxide, in a 65 g Banbury mixer operating at 60 RPM and 133° C. Specifically, the polymer was first placed in the mixer, and after 0.5 minutes, the remaining ingredients except the stearic acid were added. The stearic acid was then added after 3 minutes. The initials were mixed for 5-6 minutes. At the end of the mixing the temperature was approximately 165° C. The sample was transferred to a mill operating at a temperature of 60° C., where it was sheeted and subsequently cooled to room temperature.

The finals were mixed by adding the initials and the curative materials to the mixer simultaneously. The initial mixer temperature was 65° C. and it was operating at 60 RPM. The final material was removed from the mixer after 2.25 minutes when the material temperature was between 100 and 105° C.

Test specimens of each rubber formulation were prepared by cutting out the required mass from an uncured sheet (about 2.5 mm to 3.81 mm thick), and cured within closed cavity molds under pressure for 15 minutes at 171° C. The test specimens were then subjected to various physical tests, and the results of these tests are reported in Table III. Modulus at 300% and tensile strength were measured according to ASTM D 412 (1998) Method B. Dynamic properties were determined by using a Rheometrics Dynamic Analyzer (RDA).

Bound rubber, a measure of the percentage of rubber bound, through some interaction, to the filler, was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula % bound rubber=$(100(W_d-F))/R$ where $W_d$ is the weight of the dried residue, F is the weight of the filler and any other solvent insoluble matter in the original sample, and R is the weight of the rubber in the original sample.

Examples 5 and 6

Each carbon black/silica rubber compound was prepared in three stages named Initial, Intermediate and Final. In the initial part, the polymer from Examples 1 or 2 was mixed with carbon black, silica, an antioxidant, stearic acid, and aromatic oil in a 65 g Banbury mixer operating at 60 RPM and 133° C. Specifically, the polymer was first placed in the mixer, and after 0.5 minutes, the remaining ingredients except the stearic acid were added. The stearic acid was then added after 3 minutes. The initials were mixed for 5-6 minutes. At the end of the mixing the temperature was approximately 165° C. The sample was cooled to less that about 95° C. and transferred to a remill mixer.

In the intermediate stage, the initial formulation and a silane shielding agent were simultaneously added to a mixer operating at about 60 RPM. The shielding agent employed in these examples was EF(DiSS)-60, available from Rhein Chemie Corp. The starting temperature of the mixer was about 94° C. The intermediate material was removed from the mixer after about 3 minutes, when the material temperature was between 135 and 150° C.

The finals were mixed by adding the intermediate, zinc oxide and the curative materials to the mixer simultaneously. The initial mixer temperature was 65° C. and it was operating at 60 RPM. The final material was removed from the mixer after 2.25 minutes when the material temperature was between 100 and 105° C. The test specimens were prepared and subjected to various physical tests as for Examples 3-4 above. The results of these tests are reported in Table III.

TABLE III

| | Sample No. | | | |
|---|---|---|---|---|
| | 3 | 4 | 5 | 6 |
| $ML_{1+4}$@130° C. | 24.3 | 63.7 | 54.2 | 85.4 |
| $t_{50}$ (min) | 3.13 | 3.11 | 6.84 | 5.45 |
| 300% Modulus @ 23° C. (MPa) | 14.08 | 15.55 | 10 | 12.7 |
| Tensile @ Break @23° C. (MPa) | 17.15 | 20.58 | 12.3 | 14.9 |
| tan δ 0.5% E (0° C.) | 0.2539 | 0.2969 | 0.2266 | 0.3238 |
| ΔG' (50° C.) (MPa)** | 3.9008 | 2.1052 | 6.304 | 1.892 |
| tan δ 0.5% E (50° C.) | 0.2665 | 0.2221 | 0.2431 | 0.1766 |
| Bound Rubber (%) | 14.5 | 44.4 | 22.8 | 72.3 |

**ΔG' = G' (@0.25% E)-G' (@14.5% E)

In some embodiments, the functionalized polymers of this invention advantageously provide carbon black, carbon black/silica, and silica filled-rubber vulcanizates having reduced hysteresis loss, reduced wear, and improved wet traction. Also, certain filled-rubber vulcanizates prepared with the functionalized polymers of this invention exhibit a reduced Payne effect, and good polymer processability. These functionalized polymers can be readily prepared by terminating living polymers.

Various modifications and alterations that do not depart from the scope and spirit of this invention will become apparent to those skilled in the art. This invention is not to be duly limited to the illustrative embodiments set forth herein.

What is claimed is:

1. A method for preparing a cured tire component, the method comprising:
providing a rubber formulation comprising at least one vulcanizable rubber, a filler, and a curing agent, where the at least one vulcanizable rubber is a functional polymer that is formed by anionically-polymerizing at least one diene monomer selected from the group consisting of 1,3-butadiene, isoprene, 1,3-pentadiene, 2,3-dimethyl-1,3-butadiene, 1,3-hexadiene, myrcene, and at least one vinyl aromatic monomer selected from the group consisting of styrene, α-methyl styrene, p-methylstyrene, and vinylnaphthalene, to form a reactive polymer having a living polymer end, contacting the reactive polymer with an isocyanato alkoxysilane or isothiocyanato alkoxysilane, where said isocyanato alkoxysilane or isothiocyanato alkoxysilane reacts with the living polymer end, to thereby form a polymer that is defined by the formula

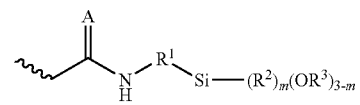

where A is oxygen or sulfur, $R^1$ is a divalent organic group, each $R^2$ and $R^3$ is a monovalent organic group, and m is an integer from 0 to 2, and ⌇⌇⌇ is an anionically-polymerized polymer, where the anionically-polymerized polymer includes from about 10 to about 50 percent mer units deriving from vinyl aromatic monomer, and where from about 8 to about 99 percent of the mer units deriving from diene monomer are in the 1,2-vinyl microstructure, and wherein the filler comprises silica;
forming the rubber formulation into an uncured tire component; and
vulcanizing the uncured tire component to form a cured tire component.

2. The method of claim 1, where the anionically-polymerized polymer is a copolymer of styrene and 1,3-butadiene.

3. The method of claim 1, where the anionically-polymerized polymer is formed by using an initiator comprising at least one element from Group 1 or Group 2 of the Periodic Table.

4. The method of claim 1, where the anionically-polymerized polymer is contacted with from about 0.3 to about 1 equivalent of terminating agent per equivalent of initiator.

5. The method of claim 1, where the initiator includes a lithium-containing initiator.

6. The method of claim 2, where the anionically-polymerized polymer is formed by using a lithium-containing initiator in the presence of a polar coordinator.

7. The method of claim 6, where the anionically-polymerized polymer includes from about 10 to about 50 percent mer units deriving from styrene, and where from about 8 to about 99 percent of the mer units deriving from 1,3-butadiene are in the 1,2-vinyl microstructure.

8. The method of claim 7, where the anionically-polymerized polymer includes from about 18 to about 40 percent mer units deriving from styrene, and where from about 10 to about 60 percent of the mer units deriving from 1,3-butadiene are in the 1,2-vinyl microstructure.

9. The method of claim 8, where the remaining mer units deriving from 1,3-butadiene are in the 1,4-cis microstructure or the 1,4-trans microstructure at a relative ratio of about 3 cis-units to about 5 trans-units.

10. The method of claim 1, where the isocyanato alkoxysilane compound or isothiocyanato alkoxysilane compound is selected from the group consisting of gamma-isocyanatopropyl-triethoxysilane, gamma-isothiocyanatopropyl-triethoxysilane, gamma-isocyanatopropyl-trimethoxysilane, and gamma-isothiocyanatopropyl-trimethoxysilane.

11. The method of claim 1, where the isocyanato alkoxysilane comprises gamma-isocyanatopropyl-trimethoxysilane.

12. The method of claim 1, where the filler further comprises carbon black.

13. A method for preparing a cured tire component, the method comprising:
providing a rubber formulation comprising at least one vulcanizable rubber, a silica filler, and a curing agent, where the at least one vulcanizable rubber is a functional polymer that is prepared by polymerizing at least one conjugated diene monomer selected from the group consisting of 1,3-butadiene, isoprene, 1,3-pentadiene, 2,3-dimethyl-1,3-butadiene, 1,3-hexadiene, myrcene, and at least one vinyl aromatic monomer selected from the group consisting of styrene, α-methyl styrene, p-methylstyrene, and vinylnaphthalene, by initiating the polymerization with a lithium-containing compound to thereby form an anionically-polymerized living polymer; and terminating the living polymer with an isocyanato alkoxysilane or isothiocyanato alkoxysilane, where the functional polymer includes from about 10 to about 50 percent mer units deriving from vinyl aromatic monomer, and where from about 8 to about 99 percent of the mer units deriving from diene monomer are in the 1,2-vinyl microstructure;
forming the rubber formulation into an uncured tire component; and
vulcanizing the uncured tire component to form a cured tire component.

14. The method of claim 13, where the isocyanato alkoxysilane compound or isothiocyanato alkoxysilane compound is selected from the group consisting of gamma-isocyanatopropyl-triethoxysilane, gamma-isothiocyanatopropyl-triethoxysilane, gamma-isocyanatopropyl-trimethoxysilane, and gamma-isothiocyanatopropyl-trimethoxysilane.

15. The method of claim 13, where the isocyanato alkoxysilane comprises gamma-isocyanatopropyl-trimethoxysilane.

16. The method of claim 13, where the rubber formulation further comprises carbon black.

* * * * *